(12) United States Patent
Tal (10) Patent No.: US 8,146,068 B2
(45) Date of Patent: Mar. 27, 2012

(54) MANAGING HEURISTIC PROPERTIES

(75) Inventor: Arie Tal, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 12/128,929

(22) Filed: May 29, 2008

(65) Prior Publication Data
US 2008/0229294 A1   Sep. 18, 2008

Related U.S. Application Data

(63) Continuation of application No. 11/249,542, filed on Oct. 13, 2005, now abandoned.

(51) Int. Cl.
*G06F 9/45* (2006.01)
(52) U.S. Cl. .......................... 717/151; 717/154
(58) Field of Classification Search .................... None
See application file for complete search history.

(56) References Cited

U.S. PATENT DOCUMENTS

| | | | |
|---|---|---|---|
| 6,922,829 B2 * | 7/2005 | Ward et al. ............... | 717/154 |
| 7,086,045 B2 * | 8/2006 | Park ........................... | 717/151 |
| 7,493,607 B2 * | 2/2009 | Moritz ....................... | 717/151 |
| 2002/0133806 A1 * | 9/2002 | Flanagan et al. .......... | 717/123 |
| 2003/0079212 A1 * | 4/2003 | Park ........................... | 717/154 |
| 2003/0088860 A1 * | 5/2003 | Wang ......................... | 717/153 |
| 2005/0138611 A1 * | 6/2005 | Inglis et al. ............... | 717/151 |
| 2006/0047794 A1 | 3/2006 | Jezierski | |

OTHER PUBLICATIONS

Lerner et el, Automaticaly Proving the Correctness of Compiler Optimizations, PLDI Jun. 2003, pp. 220-231 Retrieved on [Oct. 27, 2011] Retrieved from the Internet: URL<http://delivery.acm.org/10.1145/790000/781156/p220-lerner.pdf>.*
Monsifrot et al, A Machine Learning Approach to Automatic Production of Compiler Heuristics, AIMSA 2002, pp. 41-50 Retrieved on [Oct. 27, 2011] Retrieved from the Internet: URL<http://www.springerlink.com/content/82j59gmq06bkx8ud/fulltext.pdf>.*
Stephenson et al., "Meta Optimization: Improving Compiler Heuristics with Machine Learning", Proceedings of the ACM SIGPLAN'03 Conference on Programming Language Design and Implementation, 2003, pp. 77-90 http://groups.csail.mit.edu/commit/papers/03/metaop-pldi.pdf.
USPTO Office Action dated Oct. 2, 2009 for U.S. Appl. No. 11/249,542, pp. 1-8.

* cited by examiner

*Primary Examiner* — Thuy Dao
*Assistant Examiner* — Cheneca Smith
(74) *Attorney, Agent, or Firm* — Yee & Associates, P.C.; Libby Z. Toub (57) ABSTRACT

A computer implemented method, system and computer program product for managing heuristic properties for controlling an optimization transformation in a compiler or in other heuristically controlled software in a data processing system. A computer implemented method for controlling an optimization transformation in heuristically controlled software includes defining at least one heuristic property for controlling a behavior of an optimization transformation, and creating at least one heuristic property modifier for each desired change in the behavior of the optimization transformation. At least one of the at least one heuristic property is then modified using the at least one heuristic property modifier for achieving each desired change in the behavior of the optimization transformation.

35 Claims, 2 Drawing Sheets

FIG. 4

MANAGING HEURISTIC PROPERTIES

This application is a continuation of application Ser. No. 11/249,542, filed Oct. 13, 2005, status abandoned.

BACKGROUND OF THE INVENTION

1. Field of the Invention

The present invention relates generally to the data processing field, and more particularly, to a computer implemented method, system and computer program product for managing heuristic properties for controlling an optimization transformation in a compiler or in other heuristically controlled software in a data processing system.

2. Description of the Related Art

A compiler is a mechanism that translates a source code program that is written in a high-level, human-readable programming language, into an equivalent object code program that is in a machine language that can be executed by a computer. For each main source program and a number of additional source programs or subroutines, the compiler translates each statement in the programs into machine language equivalents. The output of the compiler is a plurality of object code programs corresponding to the input source code programs. A linker program then combines the object code programs created by the compiler (that is, supplies the interconnecting links between the program components) to create a single machine-executable program.

A number of compiler optimizations use heuristic values to control behavior, for example, a limit on the number of branches, a default unroll factor, etc. These heuristic values are usually tuned based on experience gathered from compiling benchmarks and other programs. In some cases, different heuristic values are chosen based on command-line options, for example, a different default unroll factor may be chosen depending on the target processor.

In addition to default values for heuristic properties, some command-line modifiers, such as requesting the generated code to be compact (i.e., to favor smaller size over faster code), require modifying or resetting certain heuristic values, for example, limiting unroll factors.

A current method for having each optimization transformation logically determine its defaults for heuristic properties has the advantage of encapsulating a default value choice within the transformation code. Doing so, however, has the disadvantage that it becomes more difficult to control multiple heuristic properties from a central location. As a result, any change in the policy of how these heuristic values are chosen for different cases needs to be handled every place in the code where these heuristic values are determined (and used). Adding functionality to the compiler that has a wide impact on multiple heuristic values, such as compact control or a new optimization level, can be quite cumbersome and error-prone due to the need to locate and update every heuristic property that might be affected by the new control.

An alternative solution for heuristic values is to contain all heuristic values in a central database (or data structure, similar to the idea of Java Properties—a class in the Java Development Kit for managing properties, which can be stored, dumped to a file and read back; and System properties—a specific subset which can be overridden through the –D command line option), and then update/modify them as appropriate when new optimization controls are added or modified. The disadvantage of this approach is the lack of encapsulation, that is, if any changes are made to the logic of a transformation that requires changing the defaults for its heuristic properties; the compiler writer needs to make sure that these changes are also reflected in the central database that manages these heuristics. A further disadvantage of a central database is that it adds overhead for accessing heuristic properties which may be accessed frequently. Although these values can be cached, doing so adds an unnecessary complexity to the code and requires the compiler writer to be aware of the caching.

There is, accordingly, a need for a mechanism for more efficiently managing heuristic properties for controlling an optimization transformation in a compiler or in other heuristically controlled software in a data processing system.

SUMMARY OF THE INVENTION

The present invention provides a computer implemented method, system and computer program product for managing heuristic properties for controlling an optimization transformation in a compiler or in other heuristically controlled software in a data processing system. A computer implemented method for controlling an optimization transformation in heuristically controlled software includes defining at least one heuristic property for controlling a behavior of an optimization transformation, and creating at least one heuristic property modifier for each desired change in the behavior of the optimization transformation. At least one of the at least one heuristic property is then modified using the at least one heuristic property modifier for achieving each desired change in the behavior of the optimization transformation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
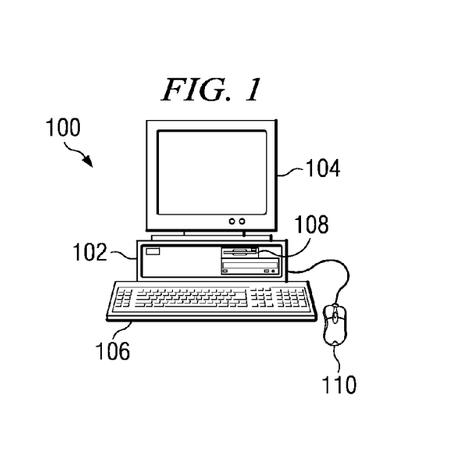
FIG. 1 is a pictorial representation of a data processing system in which aspects of the present invention may be implemented.
Figure 2:
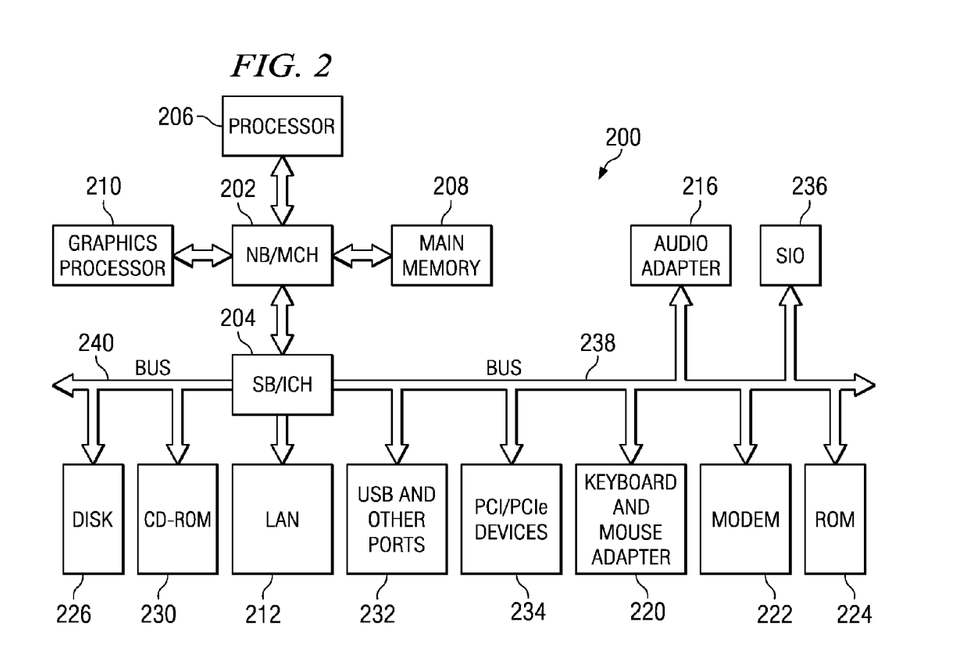
FIG. 2 is a block diagram depicting a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures and in particular with reference to FIG. 1, a pictorial representation of a data processing system is depicted in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is depicted in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides a computer implemented method, system and computer program product for managing heuristic properties for controlling an optimization transformation in a compiler or in other heuristically controlled software in a data processing system. According to an exemplary embodiment of the present invention, "heuristic modifiers" are applied to sets of heuristic properties in order to adjust the heuristic properties.

Figure 3:
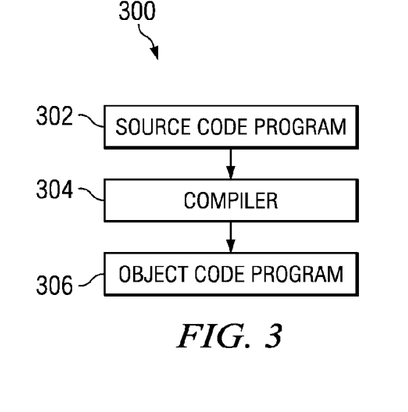
FIG. 3 is a block diagram that schematically illustrates a compiler system in which aspects of the present invention may be implemented.

FIG. 3 is a block diagram that schematically illustrates a compiler system within which aspects of the present invention may be implemented. The system is generally designated by reference number 300, and, as illustrated, a user, such as a programmer, may define a source code program 302 that is written in a high-level, human-readable language. Once source code program 302 is defined, compiler 304 translates the source code program into an equivalent object code program 306 that is in a machine language such that it can be executed by a computer. Compiler 304 may be implemented in a data processing system, such as data processing system 200 illustrated in FIG. 2.

The present invention provides the advantageous features of both encapsulation and central management, as well as low overhead. In addition, the invention provides coarse-grain and fine-grain control over heuristic values without it being necessary to modify the compiler source, along with built-in logic to do "full-scale modifications" of heuristic properties based on "modification logic". For example, according to an exemplary embodiment of the present invention, when applying a compact control modification, all relevant heuristic values are modified to satisfy the constraints implied by "compact". These full-scale modifications can also be applied on top of one another, contributing to the simplicity of implementing different behaviors expected from the compiler according to user requirements (given through command-line options). For example, the "compact" control and the "favor-compile-speed" control can be combined on top of one another to provide the expected behavior. This combination is done through applying the appropriate 'full-scale modifiers', also referred to herein as 'Heuristic Context Modifiers', one after the other on the centrally managed heuristic context (the 'database').

According to an exemplary embodiment of the present invention, each optimization transformation is assigned an abbreviation, i.e., a unique text string without spaces that will represent the transformation. For example, the unroll-and-jam transformation is represented by the abbreviation "unrolljam", the Index-Set Splitting transformation is represented by the abbreviation "ixsplit", and so on.

For each transformation, a set of heuristic properties controlling the "behavior" of the transformation is defined; and an abbreviation is assigned to each property. The abbreviations are preferably chosen to be general enough such that if a number of optimization transformations share the same heuristic property, a single abbreviation can be used for that heuristic property. Separate instances for each controlled transformation are still used so that they can be independently controlled. The common abbreviation, however, enables a quick and easy way of controlling all the transformations that depend on that heuristic property. For example, the 'Use Register Pressure' heuristic property is assigned the "regpr" abbreviation. A number of transformations are affected by this heuristic property, including Unroll-and-Jam and Predictive Commoning.

For each instance of a heuristic property, the following components are defined:

1. Abbreviation—As indicated above, a short name, with no spaces, that is used to represent the heuristic property. This component is hereafter referred to as <abbrev>.

2. Transformation Abbreviation—The abbreviation of the optimization transformation in which this instance of a heuristic property is defined, and which the heuristic property controls. This component is hereafter referred to as <transabbrev>.

3. Default value—This is the default value for the heuristic property. That is, if there are no modifications applied to the heuristic property, this will be the value of the heuristic property.

4. Range—The range of permitted values allowed for this property. For example, for a logical (Boolean) heuristic property, the range of values may be {Off, On}, or {False, True}, or {0, 1}. Range is defined as a union of sub-ranges. That is, a Range of a heuristic property can be defined to be {1-4, 8-15}, which would mean that the permitted values for this property are any values from 1 to 4 or from 8 to 15. Therefore, 2 and 9 would be permitted values in this Range, but 7 and 19 would not be permitted values (It is assumed that numerical ranges are given as a sequence of 1 or more sub-ranges, in order, and that the sub-ranges do not overlap).

5. Description—A short textual description of the heuristic property or a key to a multilingual catalogue that contains descriptions of the heuristic property in the set of native languages supported by the product.

A Heuristic Context is a data structure where heuristic property instances get registered. Each optimization transformation has a direct reference to the heuristic properties it defines; however, when a heuristic property is defined, it gets automatically registered in some Heuristic Context. The Heuristic Context allows centralized access to all the heuristic properties registered in that context. Heuristic Property instances in the Heuristic Context are generally accessed using a key composed of "<transabbrev>.<abbrev>" of the property. For example, to access the 'Use Register Pressure' heuristic property of the Unroll-and-jam transformation, the key "unrolljam.regpr" would be used.

A Heuristic Context Modifier is a set of (<key>,<operator>,<value>) triplets, where <operator> is one of {"=", "<", ">"}, and <key> and <value> are strings with no spaces in them. For example, the following Heuristic Context Modifier {("unrolljam.regpr",=,"false"), ("ixsplit.maxibranch",<,3)}, modifies the 'Use Register Pressure' heuristic property of the Unroll-and-jam transformation to "false", and adds a temporary constraint for the 'Maximum Inductive Branch' heuristic property of the "Index-Set Splitting" transformation to be less than 3 (see description below regarding the use of temporary constraints).

A Heuristic Context can register multiple Heuristic Context Modifiers, which are applied in the order in which they were registered. The application of any modifiers is done at the time a heuristic property gets registered in the context. This allows Heuristic Context Modifiers to be registered before the transformations actually begin, or before any of the heuristic properties get registered in the Heuristic Context. This also allows the modification of heuristic property values to be prioritized, based on the source of the modification (as will be explained hereinafter, multiple "sources" for modifications are allowed: the transformation itself, the heuristic context modifiers, and external files or command-line options).

An additional flexibility is added when modifiers are used that refer to keys that contain only the <abbrev> of a heuristic property. For example, the Heuristic Context Modifier {("regpr",=,"false")} will cause the 'Use Register Pressure' heuristic property of any transformation that defines it to have the value "false". On the other hand, due to the prioritization of modifiers, the use of register pressure can be very easily turned off everywhere, except for the transformation where it is desired to be used. For example, the Heuristic Context Modifier {("regpr",=,"false"), ("unrolljam.regpr",=,"true")} will turn off use of register pressure in every transformation except for Unroll-and-jam.

Adding a simple parsing component to the Heuristic Context Modifier, and allowing constructing of a Heuristic Context Modifier instance using an input string, considerably simplifies the definition of such modifiers. For example, the Heuristic Context Modifier from the example above could be defined using the string "regpr=false:unrolljam.regpr=true".

Adding the parser adds a great deal more flexibility. For example, all the heuristic properties and their values in a given context can be dumped to a file, along with 'comments' (the '#' character is defined as the beginning of a comment that ends at the end of the line). The comments can contain the description text for each heuristic property, its default value, and a range of allowed values. A simple text editor can then be used to modify the property values in the file, and feed that file back into the construction of the desired Heuristic Context Modifier. This flexibility can also be taken a step further by allowing for a command line option that can take a Heuristic Context Modifier string as its value, that is applied last on any heuristic property.

In the parser, ':' or white space is used as a separator between definitions of heuristic property values. The example above uses ':' since it emulates the way these options can be given at the command-line. This simplifies the process of tuning the compiler by using the command-line to tune certain heuristic properties, without it being required to rebuild the compiler every time, and then pasting that command-line as a string into the construction of a Heuristic Context Modifier.

As indicated above, a Heuristic Context Modifier contains a set of (<key>,<operator>,<value>) triplets. The use of the assignment operator '=' was demonstrated above. Namely, a modifier may contain the assignment of a new value for a property (note that the value has to be in the range of permitted values defined for that property).

The '<' (lesser-than) operator is used to set a "temporary constraint" on the value of a Heuristic Property (note: temporary constraints apply only to numerical Heuristic Properties). That is, at the time the modifier is applied, the value of the Heuristic Property has to be in the permitted range defined for that property and satisfy that constraint, if possible. For example, the Heuristic Property "ixsplit.maxibranch", which was mentioned above, may have a default value of 4, and a permitted value range of 1-16. The modifier to be applied "ixsplit.maxibranch<3" requires that the value of that property will be at most 2. Since before applying the modifier, the Heuristic Property temporarily contains the value 4 (which is the default and is larger than the maximum value requested), the Heuristic Property "ixsplit.maxibranch" would be set with the value 2.

If, however, the default value for the Heuristic Property "ixsplit.maxibranch" is set to be 1 (or if the value was set to 1 by some previous Heuristic Context Modifier), then applying the modifier "ixsplit.maxibranch<3" would not affect the value of that property since the current value already satisfies the constraint.

The '>' (greater-than) operator is used in a similar way (to request a temporary lower bound on the value of the property, instead of a temporary upper bound). Referring back to the above example with the "ixsplit.maxibranch" Heuristic Property containing the temporary value of 4 (with a permitted range of 1-16), if the modifier "ixsplit.maxibranch>20" is applied, the Heuristic Property "ixsplit.maxibranch" would be set with the value 16, which is a permitted value (i.e., in the permitted value range for the property) that is closest to the requested value.

It should be clear that if the permitted value range of a Heuristic Property, for example, "a.b", is multi-range e.g., 1-4, 8-16), and the "a.b" heuristic property has the current value of, say 3, then a temporary constraint "a.b>6" would cause setting "a.b" to the value 8.

The temporary constraint operators (i.e., operators '<' and '>') are defined to be more "loose" than the assignment operator (i.e., the operator '='), since it is desirable to be able to apply them on top of one another and retain as much of the previous setting as possible. That is, if a value of a property is set to some small value, any constraint that sets a lower bound would try to keep that value small (i.e., if the value was smaller than the lower bound, set it to the lower bound). If the value was large and a lower bound is set which is smaller, that lower bound would have no effect on the value (i.e., that value would remain as large as it was set by default or by the previous modifier).

The approach of using Heuristic Context Modifiers enables "heuristic aspects" to be defined for the compiler. That is, a set of behaviors for transformations (determined by values or temporary constraints) that would determine a general desired behavior of the compiler. An example of a heuristic aspect is "compactness". Generally, compactness requires optimization transformations to generate code that is "compact", i.e., the generated code should prefer code size over code speed. This may require turning some optimization off, and limiting the behavior of other transformations. According to an exemplary embodiment of the present invention, "compactness" is defined as a set of value modifications for the Heuristic Properties defined by the different transformations. Temporary constraint modifiers are also used on some of the heuristic properties. A "compactness" aspect is then defined as a Heuristic Context Modifier that is registered with the Heuristic Context when the user of the compiler specifies the compact option. The resulting values of the Heuristic Properties registered by the optimization transformations would cause the compiler's behavior change, i.e., to generate compact code.

Another example of a "heuristic aspect" is "favor-compile-speed". Generally, "favor-compile-speed" requires optimization transformations to favor fast compile-time over performance of the generated code. That means that certain transformations may need to be turned off, and others would need to be limited (or partially limited) to enable them to be faster (sacrificing potential run-time performance gains). The "favor-compile-speed" aspect is then defined as a Heuristic Context Modifier that is registered with the Heuristic Context when a user of the compiler requires a faster compile-time.

The design of the framework for managing Heuristic Properties enables Heuristic Context Modifiers to be applied on top of one another. This means that they can be registered with a Heuristic Context in an order of preference before any optimization transformations are applied, and have them applied to the Heuristic Properties as they get registered by the transformations. This enables, for example, a request to a user of the compiler for both the "compactness" aspect and the "favor-compile-speed" aspect to be easily supported, since these Heuristic Context Modifiers would simply be applied on top of one another with as little contradiction between them as possible.

In order to further clarify this aspect of the present invention, the following demonstrates what happens to specific Heuristic Properties during such an application, and how these values affect the compiler.

Initially, the order in which the modifiers are applied is determined. Since the last modifier is applied last, this means that it has the higher priority. Therefore, the "compactness" modifier is defined to be applied last (since compactness is favored over compile-speed if both are requested).

Assume that the "favor-compile-speed" turns off, say, "Loop Fusion" (turning off of transformations is achieved by having each transformation define an "enabled" heuristic property which it checks before executing. Therefore, if any of the "enabled" properties is set off, transformations would be turned off). The "favor-compile-speed" is actually more aggressive (and uses another feature of the framework for that). It turns off all transformations using the general "enabled" abbrev to do that, and then turns on only a subset of transformations, e.g., "unrolljam.enabled=true". That way, when new transformations are added to the compiler, they will be off by default for the "favor-compile-speed" aspect, and they can be enabled if it is chosen to do so (i.e., if they are fast enough).

Also assume that "favor-compile-speed" turns off use of Register Pressure ("regpr=false") for all transformations, and sets an upper-bound temporary constraint on the 'Maximal Inductive Branches' heuristic property in the Index Set Splitting transformation ("ixsplit.maxibranch<3").

The "compactness" aspect may set some properties (e.g., "fusion.guarded=false") for Loop Fusion, however, with the "favor-compile-speed" applied before it has turned off loop fusion, the setting of this property will have no effect when these two modifiers are combined, since "compactness" does not specifically turn on loop fusion.

The "compactness" aspect may set "ixsplit.maxibranch<2", which determines a smaller upper-bound for the 'Maximal Inductive Branches' heuristic property in the Index Set Splitting transformation. When applied on-top of the "favor-compile-speed" aspect, this would cause the heuristic value of "ixsplit.maxibranch" to be set to 1. Since temporary constraints are being used here instead of absolute values, it would make no difference if the "compactness" aspect was applied before the "favor-compile-speed" aspect rather than after it since applying "ixsplit.maxibranch<2" before "ixsplit.maxibranch<3" would still result in "ixsplit.maxibranch" being set to 1.

On the other hand, applying a "more-loop-fusion" aspect (if one were created), would probably specifically turn on loop fusion (if it was off), and other sub-features of loop-fusion, and also enable more Index-Set splitting (i.e., increase the lower-bound on "ixsplit.maxibranch", to enable taking the resulting loops apart into separate nests that do not contain inductive branches (which are easier to optimize)). Although this would contradict the "compactness" and "favor-compile-speed" on the general level, these modifications would be specifically applied to Loop Fusion and Index-Set splitting, thus not affecting any of the modifications done to the other transformations. The result is that the general behavior implied by either "compactness" or "favor-compile-speed" (or both) would still be there, except for the two transformations that were affected by the additional modifier.

As can be seen from the above description, the framework according to exemplary embodiments of the present invention enables extremely flexible control of heuristic properties. The nature of heuristic values is such that they are usually not absolute (i.e., different aspects may have different impacts on these values), and some tuning effort is needed to set the defaults for heuristic properties, however, the complexity of tuning different values for different user options and different combinations of options may be too great. The framework of the present invention allows defining "heuristic aspects" that correspond to user options, and combining different aspects (due to the use of temporary constraints, among other things) to create the desired combined behaviors.

The following description provides a summary of the mechanisms for implementing a framework for managing heuristic properties in a compiler or in other heuristically controlled software in a data processing system according to exemplary embodiments of the present invention.

HeuristicContext

The Heuristic Context contains a hash table of heuristic properties. Every heuristic property that gets registered in the context has a reference to it added to this hash table, using its 'key' (i.e., the string composed of "<transabbrev>.<abbrev>") as the key to the hash table.

The Heuristic Context also contains an ordered list of HeuristicContextModifier references. The process of registering a HeuristicContextModifier in a HeuristicContext appends a reference to the HeuristicContextModifier into that ordered list.

The heuristic context modifier is simply a set of triplets (key, operator, value) with not much logic behind it, except for it being managed as a hash table with the 'key' field of each triplet being used to access entries in the table. The actual logic happens when a heuristic property gets registered in the HeuristicContext.

Registering a Heuristic Property

For each Heuristic Property that is being registered:

An entry in the hash table of heuristic properties is added with the "<transabbrev>.<abbrev>" combined string used as the key, and the Heuristic Property object reference as the data.

The value of the Heuristic Property is set to its designated default value (which is part of the definition of a Heuristic Property in the framework).

For each HeuristiccontextModifier in the order in which they are registered with the HeuristicContext (the command-line option for defining heuristic modifications is appended as the last modifier):

If the HeuristicContextModifier contains a triplet (key, operator, value) where key is "<transabbrev>.<abbrev>", then
Call SetHeuristicPropertyValue with a reference to the Heuristic Property, and the operator and the value from the triplet.

Else, if the HeuristicContextModifier contains a triplet (key, operator, value) where key is "<abbrev>", then
Call SetHeuristicPropertyValue with a reference to the Heuristic Property, and the operator and the value from the triplet.

Procedure SetHeuristicPropertyValue (ref,op,val)

Input:

ref—A reference to a Heuristic Property op—An operator (one of '<', '=', '>')

val—A value to be used for modifying the Heuristic Property

Output:

May modify the value of ref.value

Algorithm:

If operator is '=', then
Set ref.value to val
Else if operator is '<' and ref.value is larger than or equal to val, then
Set ref.value to ClosestsLowerInRange (ref, val)
Else if operator is '>' and ref.value is smaller or equal to val, then
Set ref.value to ClosestsHigherInRange (ref, val)

Function ClosestsLowerInRange (ref, val)

Input:

ref—A reference to a Heuristic Property val—A value to be used for modifying the Heuristic Property Output:

Largest "permitted" value for Heuristic Property ref that is still smaller than val (if one exists, or the smallest permitted value in ref.Range otherwise)

Algorithm:

Set closest_range to nil

For each sub-range [lower-bound, upper-bound] in ref.Range from first to last and while lower-bound is less than val
Set closest_range to [lower-bound, upper-bound]

If closest_range is some [lower-bound, upper-bound] (i.e., not nil) then
If upper-bound is greater than or equal to val, then return the result of val−1
Else, return upper-bound Else,
Let [lower-bound, upper-bound] be the first sub-range in ref.Range
Return lower-bound Function ClosestsHigherInRange (ref.val)

Input:

ref—A reference to a Heuristic Property val—A value to be used for modifying the Heuristic Property Output:
    Smallest "permitted" value for Heuristic Property ref that is still larger than val (if one exists, or the largest permitted value in ref.Range otherwise)
Algorithm:
Set closest_range to nil
For each sub-range [lower-bound, upper-bound] in ref.Range from last to first and while upper-bound is greater than val
    Set closest_range to [lower-bound, upper-bound]
If closest_range is some [lower-bound, upper-bound] (i.e., not nil), then
    If lower-bound is smaller than or equal to val, then return the result of val+1
Else,
    Let [lower-bound, upper-bound] be the last sub-range in ref.Range
    Return upper-bound.

Figure 4:
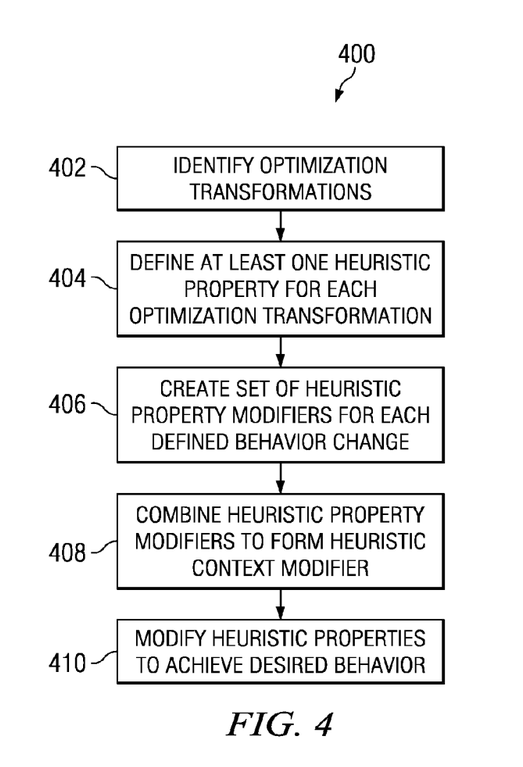
FIG. 4 is a flowchart that illustrates a method for controlling optimization transformations in heuristically controlled software in a data processing system according to an exemplary embodiment of the present invention.

FIG. 4 is a flowchart that illustrates a method for controlling optimization transformations in heuristically controlled software in a data processing system according to an exemplary embodiment of the present invention. The method is generally designated by reference number 400, and begins by identifying each optimization transformation to be performed (Step 402). At least one heuristic property is then defined for controlling a behavior of each optimization transformation to be performed (Step 404).

Figure 5:
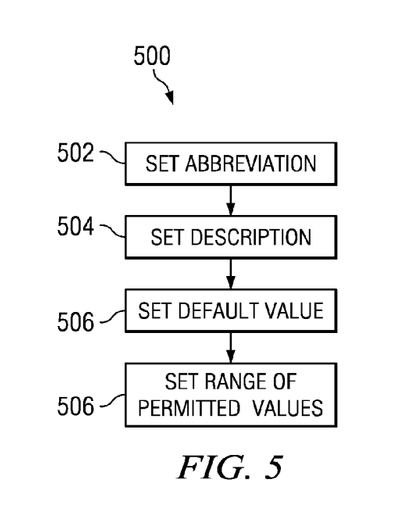
FIG. 5 is a flowchart that illustrates a method for defining a heuristic property for controlling an optimization transformation in heuristically controlled software according to an exemplary embodiment of the present invention.

FIG. 5 is a flowchart that illustrates Step 404 in greater detail. In particular, FIG. 5 is a flowchart that illustrates a method for defining a heuristic property for controlling an optimization transformation in heuristically controlled software according to an exemplary embodiment of the present invention. The method is generally designated by reference number 500, and includes, for each heuristic property that is defined, setting an abbreviation and a description that identifies the heuristic property (Steps 502 and 504), setting a default value for the heuristic property (Step 506), and setting a range of permitted values allowed for the heuristic property (Step 508). The range of permitted values may comprise a set of sub-ranges given as a sequence of sub-ranges, which are in ascending numerical order, and which do not overlap.

Returning to FIG. 4, after the heuristic properties for controlling the behavior of each optimization transformation are defined in Step 404, a set of heuristic property modifiers are created for each defined behavior change of the heuristically controlled software (Step 406). The heuristic modifiers are then combined together to form a heuristic context modifier that can be used to change a specific aspect of the behavior (or the entire behavior) of the heuristically controlled software (Step 408), and the heuristic properties that need to be modified to achieve a desired behavior of the optimization are then modified to complete the process (Step 410). Steps 406-410 may be repeated as often as needed for each behavioral change that is to be added.

The present invention thus provides a computer implemented method, system and computer program product for managing heuristic properties for controlling an optimization transformation in a compiler or in other heuristically controlled software in a data processing system. A computer implemented method for controlling an optimization transformation in heuristically controlled software includes defining at least one heuristic property for controlling a behavior of an optimization transformation, and creating at least one heuristic property modifier for each desired change in the behavior of the optimization transformation. At least one of the at least one heuristic property is then modified using the at least one heuristic property modifier for achieving each desired change in the behavior of the optimization transformation.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from (or comprising) a computer-usable or computer-readable medium providing computer-usable or computer-readable program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for controlling an optimization transformation in heuristically controlled software, comprising:
    defining at least one heuristic property for controlling a behavior of an optimization transformation;
    creating at least one heuristic property modifier for each desired change in the behavior of the optimization transformation, wherein creating at least one heuristic property modifier for each desired change in the behavior of the optimization transformation comprises creating a plurality of heuristic property modifiers for at least one desired change in the behavior of the optimization transformation; and modifying at least one of the at least one heuristic property using the at least one heuristic property modifier for achieving each desired change in the behavior of the optimization transformation, wherein modifying at least one of the at least one heuristic property using the at least one heuristic property modifier for achieving each desired change in the behavior of the optimization transformation comprises modifying one of the at least one heuristic property using the plurality of heuristic property modifiers one on top of another in order of priority.

2. The computer implemented method according to claim 1, wherein defining at least one heuristic property for controlling a behavior of an optimization transformation comprises:
identifying each at least one heuristic property; and
setting a range of permitted values for each at least one heuristic property.

3. The computer implemented method according to claim 2, wherein identifying each at least one heuristic property comprises:
providing an abbreviation representing each at least one heuristic property.

4. The computer implemented method according to claim 3, wherein identifying each at least one heuristic property further comprises:
providing a textual description of each at least one heuristic property.

5. The computer implemented method according to claim 2, wherein setting a range of permitted values for each at least one heuristic property, comprises:
setting a plurality of sub-ranges of permitted values for at least one of each at least one heuristic property.

6. The computer implemented method according to claim 2, wherein defining at least one heuristic property for controlling a behavior of an optimization transformation further comprises:
setting a default value for each at least one heuristic property.

7. The computer implemented method according to claim 1, wherein creating at least one heuristic property modifier for each desired change in the behavior of the optimization transformation, comprises, for each at least one heuristic property modifier:
forming an identifier representing an associated heuristic property;
forming an operator for identifying a modification to be made to the associated heuristic property; and
forming a value for the modification.

8. The computer implemented method according to claim 7, wherein forming an operator for identifying a modification to be made to the associated heuristic property comprises:
forming an assignment operator for assigning a new value to the associated heuristic property.

9. The computer implemented method according to claim 7, wherein forming an operator for identifying a modification to be made to the associated heuristic property comprises:
forming a temporary constraint operator for setting a temporary constraint on a value of the associated heuristic property, wherein the temporary constraint operator comprises one of a greater than temporary constraint operator and a lesser than temporary constraint operator.

10. The computer implemented method according to claim 1, wherein at least one heuristic property abbreviation refers to a plurality of heuristic properties, and wherein the computer implemented method further comprises:
setting a first value for all of the plurality of heuristic properties that are referenced by the at least one heuristic property abbreviation; and
setting values different from the first value for a specific subset of the plurality of heuristic properties that includes at least one of the plurality of heuristic properties, wherein each at least one heuristic property included in the subset of the plurality of heuristic properties is referenced with both a transformation abbreviation that represents an optimization transformation in which the heuristic property is defined and the heuristic property abbreviation.

11. The computer implemented method according to claim 1, wherein creating at least one heuristic property modifier for each desired change in the behavior of the optimization transformation comprises:
creating a plurality of heuristic property modifiers for at least one desired change in the behavior of the optimization transformation; and wherein modifying at least one of the at least one heuristic property using the at least one heuristic property modifier for achieving each desired change in the behavior of the optimization transformation, comprises:
modifying one of the at least one heuristic property using the plurality of heuristic property modifiers one on top of another in order of priority.

12. The computer implemented method according to claim 1, and further comprising:
combining each at least one heuristic property modifier into a heuristic context modifier for achieving desired changes in the behavior of the optimization transformation.

13. The computer implemented method according to claim 1, wherein the heuristically controlled software comprises a compiler.

14. A computer program product, comprising:
a tangible computer usable storage medium having computer usable program code for controlling an optimization transformation in heuristically controlled software, the computer program product comprising:
computer usable program code configured for defining at least one heuristic property for controlling a behavior of an optimization transformation;
computer usable program code configured for creating at least one heuristic property modifier for each desired change in the behavior of the optimization transformation, wherein creating at least one heuristic property modifier for each desired change in the behavior of the optimization transformation comprises creating a plurality of heuristic property modifiers for at least one desired change in the behavior of the optimization transformation; and
computer usable program code configured for modifying at least one of the at least one heuristic property using the at least one heuristic property modifier for achieving each desired change in the behavior of the optimization transformation, wherein modifying at least one of the at least one heuristic property using the at least one heuristic property modifier for achieving each desired change in the behavior of the optimization transformation comprises modifying one of the at least one heuristic property using the plurality of heuristic property modifiers one on top of another in order of priority.

15. The computer program product according to claim 14, wherein the computer usable program code configured for defining at least one heuristic property for controlling a behavior of an optimization transformation comprises:
   computer usable program code configured for identifying each at least one heuristic property; and
   computer usable program code configured for setting a range of permitted values for each at least one heuristic property.

16. The computer program product according to claim 15, wherein the computer usable program code configured for identifying each at least one heuristic property comprises:
   computer usable program code configured for providing an abbreviation representing each at least one heuristic property.

17. The computer program product according to claim 16, wherein the computer usable program code configured for identifying each at least one heuristic property further comprises:
   computer usable program code configured for providing a textual description of each at least one heuristic property.

18. The computer program product according to claim 15, wherein the computer usable program code configured for setting a range of permitted values for each at least one heuristic property, comprises:
   computer usable program code configured for setting a plurality of sub-ranges of permitted values for at least one of each at least one heuristic property.

19. The computer program product according to claim 15, wherein the computer usable program code configured for defining at least one heuristic property for controlling a behavior of an optimization transformation further comprises:
   computer usable program code configured for setting a default value for each at least one heuristic property.

20. The computer program product according to claim 14, wherein the computer usable program code configured for creating at least one heuristic property modifier for each desired change in the behavior of the optimization transformation, comprises, for each at least one heuristic property modifier:
   computer usable program code configured for forming an identifier representing an associated heuristic property;
   computer usable program code configured for forming an operator for identifying a modification to be made to the associated heuristic property; and
   computer usable program code configured for forming a value for the modification.

21. The computer program product according to claim 20, wherein the computer usable program code configured for forming an operator for identifying a modification to be made to the associated heuristic property comprises:
   computer usable program code configured for forming an assignment operator for assigning a new value to the associated heuristic property.

22. The computer program product according to claim 20, wherein the computer usable program code configured for forming an operator for identifying a modification to be made to the associated heuristic property comprises:
   computer usable program code configured for forming a temporary constraint operator for setting a temporary constraint on a value of the associated heuristic property, wherein the temporary constraint operator comprises one of a greater than temporary constraint operator and a lesser than temporary constraint operator.

23. The computer program product according to claim 14, wherein at least one heuristic property abbreviation refers to a plurality of heuristic properties, and wherein the computer program product further comprises:
   computer usable program code configured for setting a first value for all of the plurality of heuristic properties that are referenced by the at least one heuristic property abbreviation; and
   computer usable program code configured for setting values different from the first value for a specific subset of the plurality of heuristic properties that includes at least one of the plurality of heuristic properties, wherein each at least one heuristic property included in the subset of the plurality of heuristic properties is referenced with both a transformation abbreviation that represents an optimization transformation in which the heuristic property is defined and the heuristic property abbreviation.

24. The computer program product according to claim 14, wherein the computer usable program code configured for creating at least one heuristic property modifier for each desired change in the behavior of the optimization transformation comprises:
   computer usable program code configured for creating a plurality of heuristic property modifiers for at least one desired change in the behavior of the optimization transformation; and wherein the computer usable program code configured for modifying at least one of the at least one heuristic property using the at least one heuristic property modifier for achieving each desired change in the behavior of the optimization transformation, comprises:
   computer usable program code configured for modifying one of the at least one heuristic property using the plurality of heuristic property modifiers one on top of another in order of priority.

25. The computer program product according to claim 14, and further comprising:
   computer usable program code configured for combining each at least one heuristic property modifier into a heuristic context modifier for achieving desired changes in the behavior of the optimization transformation.

26. The computer program product according to claim 14, wherein the heuristically controlled software comprises a compiler.

27. A data processing system including a processor for controlling an optimization transformation in heuristically controlled software in a data processing system, comprising:
   a mechanism for defining at least one heuristic property for controlling a behavior of an optimization transformation;
   a mechanism for creating at least one heuristic property modifier for each desired change in the behavior of the optimization transformation, wherein creating at least one heuristic property modifier for each desired change in the behavior of the optimization transformation comprises creating a plurality of heuristic property modifiers for at least one desired change in the behavior of the optimization transformation; and
   a mechanism for modifying at least one of the at least one heuristic property using the at least one heuristic property modifier for achieving each desired change in the behavior of the optimization transformation, wherein modifying at least one of the at least one heuristic property using the at least one heuristic property modifier for achieving each desired change in the behavior of the optimization transformation comprises modifying one of the at least one heuristic property using the plurality of heuristic property modifiers one on top of another in order of priority.

28. The data processing system according to claim 27, wherein the mechanism for defining at least one heuristic property for controlling a behavior of an optimization transformation comprises:
    a heuristic property identifier for identifying each at least one heuristic property; and
    a range of permitted values for each at least one heuristic property.

29. The data processing system according to claim 28, wherein the heuristic property identifier comprises an abbreviation representing each at least one heuristic property.

30. The data processing system according to claim 29, wherein the heuristic property identifier further comprises a textual description of each at least one heuristic property.

31. The data processing system according to claim 28, wherein the mechanism for defining at least one heuristic property for controlling a behavior of an optimization transformation further comprises a default value for each at least one heuristic property.

32. The data processing system according to claim 27, wherein the mechanism for creating at least one heuristic property modifier for each desired change in the behavior of the optimization transformation, comprises, for each at least one heuristic property modifier:
    an identifier representing an associated heuristic property;
    an operator for identifying a modification to be made to the associated heuristic property; and
    a value for the modification.

33. The data processing system according to claim 32, wherein the operator for identifying a modification to be made to the associated heuristic property comprises one of an assignment operator for assigning a new value to the associated heuristic property, and a temporary constraint operator for setting a temporary constraint on a value of the associated heuristic property.

34. The data processing system according to claim 27, and further comprising:
    a heuristic context modifier combining each at least one heuristic property modifier for achieving desired changes in the behavior of the optimization transformation.

35. The data processing system according to claim 27, wherein the heuristically controlled software comprises a compiler.

* * * * *